April 23, 1968     J. ALBRECHT ETAL     3,379,068

METHOD FOR TESTING RELATIVE SURFACE MOVEMENTS

Filed Sept. 27, 1965

INVENTORS
JÜRGEN ALBRECHT
HORST HÖNICKE
RUDOLF RUDER

United States Patent Office 3,379,068
Patented Apr. 23, 1968

3,379,068
METHOD FOR TESTING RELATIVE
SURFACE MOVEMENTS
Jürgen Albrecht and Horst Hönicke, Leipzig, and Rudolf Ruder, Karl-Marx-Stadt, Germany, assignors to Institut für Polygraphische Maschinen, Leipzig, Germany
Filed Sept. 27, 1965, Ser. No. 490,476
5 Claims. (Cl. 73—432)

ABSTRACT OF THE DISCLOSURE

A method for testing whether or not there is any relative movement between a pair of synchronously moving surfaces. In accordance with the method there is situated between and in engagement with the pair of synchronously moving surfaces a soft layer of uniform thickness which thus separates the surfaces from each other. These surfaces are then moved in synchronism repeatedly along predetermined strokes without adding to or removing from the soft layer so as to provide in this way, when relative movements occur between these surfaces, local variations in the thickness of the layer. These variations are indicative of any lack of synchronism.

---

Figure 1:
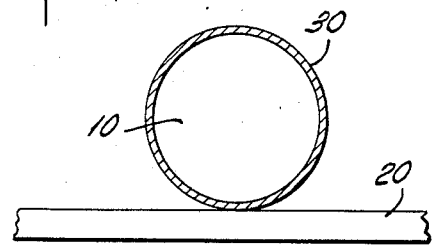

The present invention relates to a method for testing relative surface movements of parts which move in synchronism one relative to the other, such as, for example, for testing the synchronous run of two driven cylinders rolling on each other at the same circumferential speed, of a cylinder rolling along a plane surface.

In cylinder and rotary printing presses, in calenders for smoothing coated paper or the like, or for the production of sheets or foils, in rolling mills or other machines for the production, treatment or processing of materials in sheet or web form, the material is conveyed or treated between surfaces moving in synchronism relative to each other. For example, jointly driven cylinders, or a plane surface and a cylinder which are so moved with respect to each other that there is no slip therebetween, provide surfaces of this type.

Though it is not very difficult in practice to obtain a relative synchronous run of two machine elements, it is difficult to ensure and particularly to test absolute synchronism under all conditions occurring in practice.

Minor variations in the synchronism may be caused, for example, by inaccurate transmissions between gear wheels used for the synchronous drive, or by the occurrence of vibrations in the drive. These variations depend in their size more or less on the rotary speed and the loading of the machine. In printing presses, for example, they lead to localized distortions, in matching difficulties and premature wear of the printing type. In machines for the production of foils, the variations in synchronism result in non-uniform thicknesses, dull areas on the foil surface or in similar defects in the product.

In order to determine such variations in synchronization, to characterize their effects, and to detect their causes, it is necessary to undertake operational investigations under the most unfavorable or difficult conditions which only permit a subjective evaluation and do not yield reproducible results. Alternately, complex measurements must be made simultaneously at different points of the machine, using various electric measuring instruments.

These measurements for the exact determination of the trouble causes and their effects can only be carried out by skilled workers and require considerable expenditure in time and measuring gear, particularly since several test sequences must be carried out under different operating conditions and at various speeds.

The measurements do not readily lend themselves to testing machines that are already in practical use, and they yield individual results which can only be summarized, analyzed and evaluated under great difficulties and by qualified personnel. Reproducible results can hardly be expected from such test sequences unless the properties of the measuring indicators are kept constant, and measurement inaccuracies resulting from interfering voltages, varying transition resistances and varying amplification of the signals are carefully avoided.

It is the object of the invention to develop a method for measuring synchronization variations, that lead to a relative movement between two synchronously moving surfaces, which yields reproducible results with a minimum of technical expenditure, whose realization requires no special knowledge in measuring techniques, and which lends itself to use on practical machines which are already in operation.

According to one feature of the present invention, this problem is solved by uniformly covering one test surface with an extremely soft layer of uniform thickness, with the interposition of a carrier in some cases. This uniform thickness is changed at localized areas to a different thickness, when, as the result of periodic relative movement between the synchronously moving surfaces, there is a movement of one of the surfaces with respect to the soft layer which it engages.

The extremely soft layers which are suitable for these purposes can consist of materials which can be raised sufficiently from the test surface or the carrier used, as the case may be. It also is possible to use an extremely soft homogeneous layer of hard particles which vary the exterior surface characteristics of the test surface or the carrier. As a matter of example a grinding paste can be used. Further examples and details will be given as the specification proceeds.

The method according to the invention permits to subject new or reconditioned machines to an objective quality test regarding their quietness, or to evaluate the quietness on machines that are already in operation, by obtaining test patterns from the operators of the machines themselves. These test patterns can be measured centrally and evaluated if a carrier is used. In this way it is possible to test continuously machines used in practice with regard to their quietness, to detect signs of wear and to determine exactly the measures to be taken to improve the synchronism and thus the quietness of the machine without the necessity of using specially trained personnel or a comprehensive array of measuring instruments.

In practicing the invention, the us of printing ink was found expedient for the aforementioned soft layer which is applied to a surface to be tested. Particularly those inks are useful whose color tone contrasts sufficiently with the color of the test surface or carrier. For these reasons, the extremely soft layer used according to the invention is referred to below as an "ink layer."

It should be added that it is also possible to use inks with finely divided magnetic or magnetizable, radioactive or conductive particles and to evaluate them with suitable instruments, since the evaluation of the test results can be effected by other than optical means.

Since the production of a test pattern on a clamped carrier in printing presses is practically a printing operation, where one or more printing operations are performed with the inked test pattern carrier secured on the printing form holder, with the inking device disengaged and without passage of sheet or webs to be printed, so that there is no supply or removal of ink, the inventive method can be used with particular advantage for testing printing presses.

Figure 2:
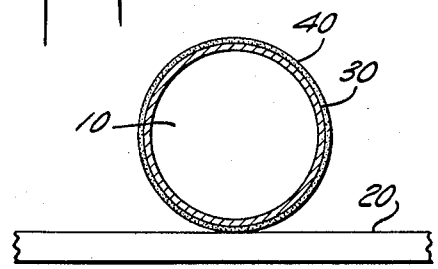
Figure 3:
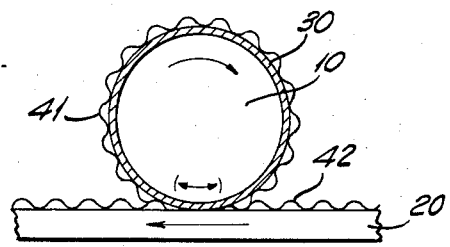
Figure 4:
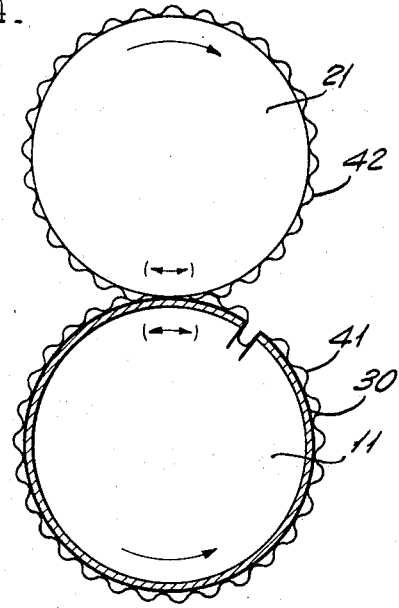

For this reason a method will be described herein, by way of an example, for evaluating the quietness of a printing cylinder in a rotary printing press. The inventive method will be appreciated and more fully understood, together with other objects and advantages thereof, with reference to the following detailed description, when considered with the accompanying drawings, wherein FIG. 1 is a schematic, partly sectional view of a printing cylinder adapted to perform a synchronous movement with a plane surface;

FIG. 2 is similar to FIG. 1 but has a completely uniform ink layer applied to the cylinder starting the test procedure according to the inventive method;

FIG. 3 shows the arrangement of FIG. 2 after the printing cylinder and the plane surface have been set to motion, a rotary oscillating movement being superposed to the synchronous movement so that a schematically illustrated test pattern forms on both the cylinder and the plane surface; and FIG. 4 is a different arrangement using a carrier and wherein two cylinders rotate in synchronism with periodic oscillating movements superposed so that a test pattern is formed.

In a printing press, a conventional printing cylinder 10 performs a synchronous movement with a cooperating bed or like element of the press, identified by numeral 20. Instead of a printing form, a glass-clear transparent foil may be applied to cylinder 10 by conventional means not shown in the drawing. However, such a foil is not used in the example of FIG. 1.

Into the carefully cleaned inking device of the press (not illustrated) is introduced a predetermined amount of printing ink. Tests have shown that an amount of 3 grams per square meter of ink-absorbing surface is sufficient. In order to obtain reproducible and comparable results, it is advisable always to use the same ink which is standardized in its properties, for example, a standardized zinc white.

The ink in the inking assembly is distributed over approximately 300 working strokes of the printing press, and subsequently the inking rollers, with the inking device activated, are engaged at a given pressure with the exterior surface of wall 30 of the cylinder 10 to apply the soft layered ink thereto. The press should run for about 300 working cycles in order to distribute the ink uniformly over the exterior surface of the wall 30 where it forms the highly uniform ink layer 40, as shown in FIG. 2. During this time the press runs at a predetermined test printing speed. It should be noted that for reasons of clarity the ink layer 40 which is only a fraction of one millimeter, has been greatly exaggerated in the drawing.

After lifting the inking rollers from the printing cylinder 10, a test pattern 41 begins to form on wall 30 and a test pattern 42 forms on the now inked bed surface 20, as schematically shown in FIG. 3. The periodic relative movements of the respective surfaces, marked by a double arrow, will result in the ink layer 40 (of FIG. 2) to assume a patterned, somewhat wavy configuration 41 on wall 30 and a somewhat similar, almost complementary wavy configuration 42 on the surface of bed 20 engaging the cylinder.

The ink is distributed on cylinder wall 30 because no sheets or webs nor any other materials to be printed are passed between these elements since they would prevent the formation of the test patterns.

FIG. 4 shows an alternative set-up wherein a printing cylinder 11, rather than a flat bed, cooperates with a counter-cylinder 21. A foil has been applied to the cylinder 11 and the ink layer has been applied thereto. During the test run, that is, after the inking rollers have been removed from cylinder 11, patterned layers 41, 42 are again formed, as has been described before, on cylinder 21 and foil respectively.

The test pattern actually starts forming a few working strokes after the lifting of the inking rollers. A visually perceptible and easily measurable test pattern develops on the foil which is an image or indication of the signs of wear of the printing form that would appear after several thousand printings. The intensity of the ink profile changes on the foil or surface tends toward a constant value which is achieved after about 2,000 working strokes. Consequently a certain number of working strokes is determined for the formation of the test pattern in order to obtain reproducible results. Thus, for example, printing is interrupted after 1,000 working strokes, the press is stopped, and the foil having the test pattern 41 thereon is carefully removed. Until the test pattern is completely dry, it must be carefully protected against damages.

Due to the repeated rolling of the test surfaces on each other, the originally uniform ink layer 40 (FIG. 2) has assumed a characteristic relief, so that any periodically repeated relative movement of the test surfaces, both in axial and in circumferential direction, can be detected from the ink profile, and can also be determined by measurement.

For the evaluation of the test pattern, the ink profile 41 and/or 42 is recorded over the entire printing length by means of an optical extinction apparatus. The resulting extinction diagram is used to evaluate the relative movements and the quietness in the press mechanism. The greater the deviations of the resulting ink profile from the originally uniform ink layer 40, the less quietly roll the test surfaces on each other.

Since, as a rule, at least one of the test surfaces is formed on the exterior of a rotary cylinder which rolls on a plane surface—as is the case in flat printing presses—a characteristic irregular ink distribution, parallel to the cylinder axis appears on the contact surfaces covered with the homogeneous ink layer, after a sufficient number of rollings (without supply or removal of ink); this wavy irregularity in the ink distribution is due to variations of synchronism, which manifest themselves in a brief trailing and leading of the cylinder surface relative to the plane surface, which can be termed the test pattern and which provides information about the type, extent and cause of the synchronization variations.

Depending on the type of machine element to be tested, the ink can be applied directly on a surface or on a carrier, and the latter secured on the surface; it is also possible to secure first a carrier on a surface and to effect the inking afterwards. In foil rolling mills, for example, direct inking of the cylinder may be advisable, since the thickness of a carrier may already be of the order of magnitude of the foil thickness or even exceed it.

With direct inking of a cylinder or of a flat surface, the test pattern, besides being capable of evaluation on the surface, can also be removed from the surface, if necessary, and stored. This can be done, for example, by passing a sheet of a highly absorbent material, whose length corresponds at least to that of a test pattern, between the cylinder and the flat surface or between the cylinders, so that the sheet absorbs the ink on both sides and stores it. When the test pattern is transferred, a portion thereof remains on the surfaces, so that the accuracy is impaired by the transfer, but if a color is used that contrasts sufficiently with that of the sheet, an image of the test pattern will remain on the sheet that can be evaluated visually with suitable measuring methods.

In the case of machines for calendering of sheet materials, a carrier that has already been inked is secured on the calender roll, since no special devices for inking the carrier are provided in these machines.

In printing presses, a carrier can be secured in the place of the printing form and inked by the existing inking device.

If the test pattern is to be obtained directly and stored, it is necessary to use a carrier. Suitable for this purpose are sheets or foils of any type and of any material, of uniform thickness and with little or no absorbency, which can be colored or transparent, metallic or non-metallic, conductive or non-conductive, depending on the method used for evaluating the ink distribution. As a rule it suffices to determine the distribution of the ink layer thickness of the test pattern produced directly on the flat surface or the cylinder, respectively, and to record it in graphical form, without the necessity of producing a test pattern on a carrier and storing it. Only in special test-pattern evaluation methods is it necessary to use a carrier, as, for example, in the evaluation by means of a color densitometer for incident and traversing light measurements, e.g., the extinction apparatus type "ERI" made by Zeiss, Jena, Germany. This instrument requires at least for one method of testing, the use of a glass-clear transparent foil as a carrier.

Test patterns produced directly on a mirror-finished surface—or cylinder circumference, where the ink layer more or less prevents the reflection of a light ray through the surface, can be evaluated by progressive reflection measurement.

The use of a printing ink as an extremely soft layer, which hardens after a certain time on the carrier and which can then practically no longer be changed in its structure, makes it possible to mail the test patterns for evaluation and storage for later comparison.

What is claimed is:

1. Method for testing the relative movement, if any, between two synchronously moving surfaces, comprising the steps of situating between and in engagement with said two surfaces a soft layer of uniform thickness separating said surfaces, and then moving said surfaces in synchronism repeatedly along predetermined strokes without adding to or removing from said layer, to provide, when relative movements occur between said surfaces, local variations in the thickness of said layer.

2. Method according to claim 1, in which the layer is applied on a surface of a carrier secured to a moving element, said carrier surface forming one of said synchronously moving surfaces.

3. Method according to claim 1, in which the layer consists of printing ink.

4. Method according to claim 1, in which the variations in the layer thickness are subsequently measured.

5. A method according to claim 1, wherein said soft layer comprises particles suspended in a paste.

References Cited

UNITED STATES PATENTS

| | | | |
|---|---|---|---|
| 2,110,306 | 3/1938 | Nabholz | 101—248 |
| 2,174,728 | 10/1939 | Potdevin | 101—248 |
| 3,130,300 | 4/1964 | Dobbins | 118—9 X |

DAVID SCHONBERG, *Primary Examiner.*